United States Patent [19]
Grindle

[11] Patent Number: 5,282,522
[45] Date of Patent: Feb. 1, 1994

[54] MULTI-PURPOSE SPEED CONTROL APPARATUS

[76] Inventor: George R. Grindle, 1226 Wilma Lois, Pasadena, Tex. 77502

[21] Appl. No.: 964,750

[22] Filed: Oct. 22, 1992

[51] Int. Cl.$^5$ .............................................. B60K 41/20
[52] U.S. Cl. ...................................... 192/1.52; 74/482; 74/501.6
[58] Field of Search ......................... 192/1.1, 1.36, 1.4, 192/1.43, 1.45, 1.46, 1.51, 1.52; 74/481, 482, 491, 501.6, 502.2, 502.6, 523; 180/333, 335

[56] References Cited

U.S. PATENT DOCUMENTS

| | | | |
|---|---|---|---|
| 1,560,037 | 11/1925 | Bushey | 74/481 X |
| 2,853,164 | 9/1958 | Sturdy | 74/501.6 X |
| 4,075,907 | 2/1978 | Petrzelka | 74/523 |
| 4,353,265 | 10/1982 | Lipshield | 74/501.6 X |

FOREIGN PATENT DOCUMENTS

| | | | |
|---|---|---|---|
| 54-13127 | 1/1979 | Japan | 192/1.1 |
| 1423816 | 2/1976 | United Kingdom | 180/335 |

*Primary Examiner*—Richard M. Lorence
*Attorney, Agent, or Firm*—Gunn & Kuffner

[57] ABSTRACT

An attachment for an automobile is disclosed which enables handicapped persons to operate a vehicle with hand applied power and without foot operation of the pedals. A mounting bracket is set forth. It has a supporting structure which connects with a pair of upstanding tabs, a rotatable shaft serving as a pivot point supported by said stubs, and a pivotally mounted lever connected to said shaft. The lever operates a bell crank mechanism. At one side the bell crank mechanism connects with a cable which is connected at the opposite end to the accelerator, carburetor or points in between to speed up the engine speed. At the opposite end of equipment, it connects with a flexible drive cable in a sheath wherein the cable and sheath extend from the installed apparatus under the vehicle and connect with the brake pedal hanger mechanism. This enables a handicap user to apply the vehicle brakes.

11 Claims, 1 Drawing Sheet

MULTI-PURPOSE SPEED CONTROL APPARATUS

BACKGROUND OF THE DISCLOSURE

This disclosure is directed to a device which when attached to an automobile, particularly assists in making the automobile more easily and readily operatable by individuals having injured or disabled feet or legs. The device can be used by those who are also partially paralyzed or who have some other physical limitations which interfere with the operation of the foot-operated pedals. This apparatus is particularly useful in providing connection of a hand operated mechanism which jointly enables use in operation of the brake pedal and the accelerator in an automobile.

Devices have been provided in the past which convert pedal-equipped automobiles for hand operation by those who have been injured or partially crippled. As a generalization, they include hand-operated devices which are often mounted on the steering column. For instance, U.S. Pat. No. 4,998,983 shows a hand-operated system which mounts on the steering column. U.S. Pat. No. 5,025,905 shows a hand-operated system that has linkage rods which extend to the various pedals. In similar fashion, U.S. Pat. No. 5,029,679 shows a hand operated control system which clamps to or attaches by means of rods to various pedal hangers. Additionally, U.S. Pat. No. 5,103,946 also mounts on the steering column and has linkage rods. In like fashion, U.S. Pat. No. 5,129,492 shows a set of connective rods.

The present disclosure avoids the steering column type connection and also avoids the rods which are installed to make such connections. It is not uncommon for rods as long as two feet, perhaps even three feet, to extend upwardly in the drivers compartment towards the steering wheel. This will typically be connected with a hand-operated crank or lever which is positioned at that height or elevation. Such devices normally position the handles at about the height of the column terminating at the steering wheel, or perhaps even higher. This is less than desirable because it substantially converts such an automobile so that conventional use of the automobile is difficult or impossible. A person who operates the foot-powered pedals in the conventional fashion simply cannot slide into the seat and operate the vehicle because of interference. It is difficult to slide in and out of the driver's seat when the region is cluttered with the connecting rods, and especially those which extend under the dash and make connections to the brake pedal. Particular problems also arise where connections are made to the brake pedal because it is closer to the door and has a greater tendency to interfere with user entry into the vehicle.

By contrast, the disclosed apparatus set forth in the present application is particularly adapted for use by an injured or crippled person in a vehicle which can also be used in a conventional manner by those drivers fortunate enough to have uninjured legs and feet. Consider the situation where a vehicle is to be shared in a family. If the wife of average build and height requires conversion because of an unfortunate handicap, and yet her husband of average build must use the vehicle, the connective rods would get in his way. If the wife intends to use the same vehicle time and again, the husband must simply contort to make use of the pedals by sliding around the connective rods exemplified by the several references noted above. Moreover, entry into the vehicle is somewhat limited. If however the apparatus of this disclosure were installed in the vehicle, it would define a vehicular system which can be readily used by both the injured or crippled wife and the otherwise healthy spouse. Other personnel could likewise use the vehicle, including parking lot attendants, service station personnel, etc.

The difficulties which result from installation of rod-type equipment are substantially avoided. The present apparatus is a mechanism which can be readily installed in a vehicle and particularly in the type of vehicle which has front seats which are sometimes known as bucket seats. Typically, the bucket seats are deployed on the flanking sides of the floor located tunnel which encloses the automotive engine transmission and which transmission connects with the drive shaft extending to the rear of the vehicle. This hump or tunnel is normally cosmetically treated rather well by placing a tray or storage container between the two front seats, and especially between the two bucket seats. Moreover, the shift lever is normally located in that locale so that the operator can grasp the shift lever with the right hand and operate the lever. In view of the fact that most automobiles driven in this country have automatic transmissions, typically the shift lever will provide the necessary choices at the quadrant indicated at the shift lever to select the right gear for driving. More importantly, such a vehicle can be easily converted by installation of the present apparatus.

This device is a system which is relatively narrow in foot print, referring to the mounting area which supports the apparatus, and can be attached next to or adjacent and forward of the automotive transmission shift lever normally provided. It has the advantage of being positioned relatively low so that the operator does not have to reach up in the air with the right hand to either apply the brakes or to accelerate the vehicle. The present apparatus can therefore be used by a driver who can readily rest the right hand during driving, the hand resting at approximately knee height on most drivers of average height. The right hand is used to control both the brake pedal and accelerator. Moreover, the device is sized so that a handle can be easily grasped in the hand of the user while turning the hand with the palm facing downwardly. This hand operation of the equipment is easily done even when the driver is required to take control of the vehicle for hundreds of miles. Driver comfort is thus assured even over a long time frame. Because the hand is not raised and because the equipment is operated conveniently to the transmission shift lever, the same type of motion can be readily implemented by the driver. In other words, operator comfort is gained significantly at all points in time.

Summarizing, the present apparatus it is an adapter which can be placed on an automobile equipped with a central console on the tunnel or hump in a vehicle to thereby convert the brake pedal and accelerator to hand operation. It has a mounting bracket which enables the device to be mounted in that region approximately even with the right knee of the driver. This enables the driver to rest the right hand conveniently on the equipment so that driving is readily occasioned by comfort without holding the hand excessively high. Moreover, this enables and permits the equipment to be operated for many hours with driver comfort. Once installed, the equipment can be left permanently in the vehicle. At the time of installation, permanent connections are made to operate both the brake pedal and the accelerator. These can be left on the vehicle indefinitely. However, their presence does not interfere with the ordinary and conventional operation of the pedals by a person not requiring this equipment. For those who are not handicapped, they still have access to the brake pedal and access to the accelerator without interference from the present equipment. This device is therefore a base plate or mounting bracket which is installed on the vehicle. It supports upstanding mounting plates which in turn connect with a transverse mounting shaft. That shaft connects with a hand operated bell crank. In turn, the bell crank supports a forwardly protruding tab which connects with the accelerator by means of a flexible cable and also supports a rearwardly projecting tab which connects with the brake pedal. As will be detailed in the specifics of this apparatus it is a relatively simple structure to install on the vehicle and is also relatively simple to interconnect with the respective pedals. When installed, it can be hand operated continuously by the handicap driver or can be ignored by a person who prefers to use the pedals in the conventional fashion.

BRIEF DESCRIPTION OF THE DRAWINGS

So that the manner in which the above recited features, advantages and objects of the present invention are attained and can be understood in detail, more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
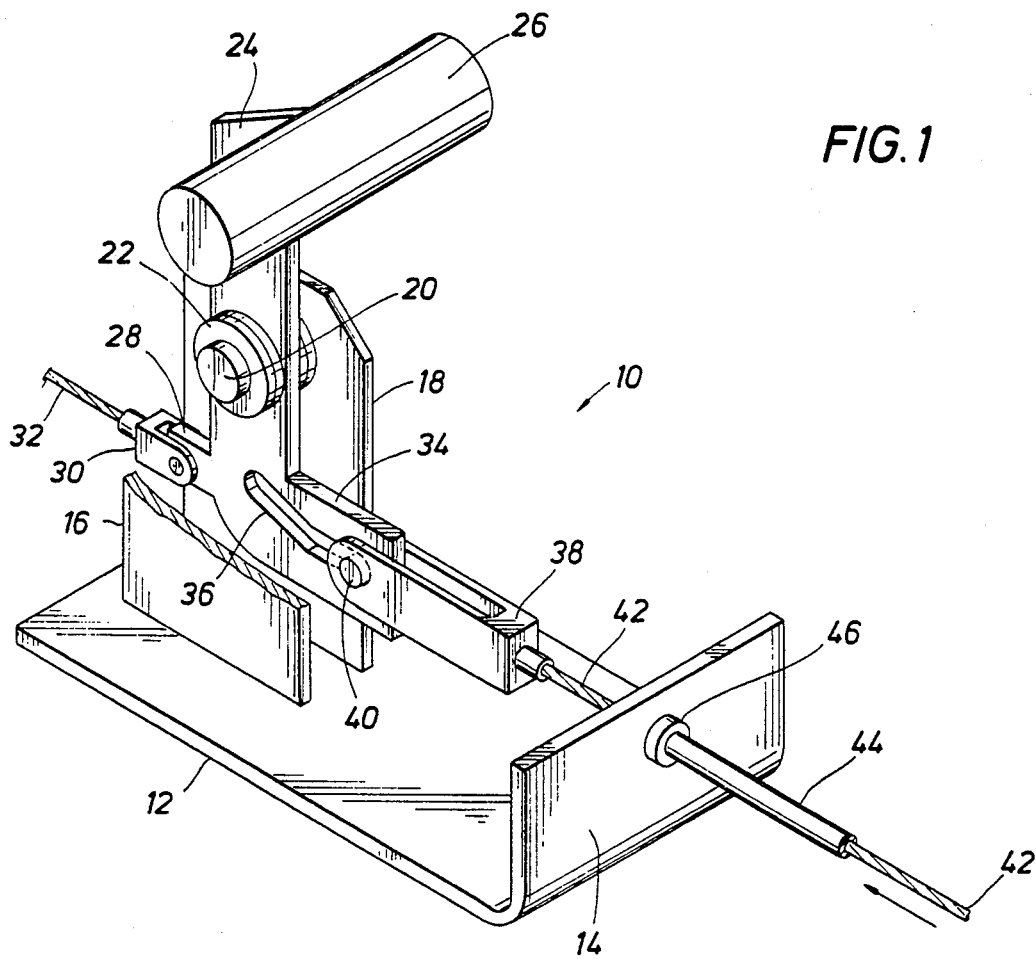
FIG. 1 is a perspective view showing the adapter of the present apparatus for installation in an automobile to interconnect with the brake pedal and accelerator to provide hand operation of the pedal and accelerator so that the vehicle can be driven.

In FIG. 1 of the drawings, the numeral 10 identifies the adapter of the present disclosure installed for operation by a person who is unable to otherwise operate the foot powered pedals in the conventional fashion. The apparatus 10 incorporates a base plate 12 which supports an upstanding tab 14 at the back end. Typical dimensions of the base plate 12 are perhaps 3 or 4 inches in width and up to about 6 through 12 inches in length. It can be formed of metal and is made attractive. It typically is a finished metal plate which thereby permits the device to be installed without appearing tacky or ugly when installed in a vehicle. The base plate 12 supports duplicate upstanding bushing support plates 16 and 18. They are incorporated to support a transverse mounting shaft 20. While the plate 16 has been broken away to enhance clarity of the drawings, it will be understood how the two plates are parallel and extend to a sufficient height to locate the mounting shaft. The shaft is supported in an elevated position, parallel to the base plate 12 and located so that it provides a rotational pivot for the operator to hand control the vehicle.

The shaft 20 supports a set of spacer washers 22 which define the gap between the plates 16 and 18 and a bell crank mechanism. An upstanding lever 24 supports a transverse hand grip 26 which is sized in length and diameter to easily fit in the hand of a user. It is sized so that the user can rest the right hand on the grip 26. The surface of the grip can be metal or can be finished with surface enhancements such as by knurling. If desired, the surface can be provided with an enhancement for easy gripping such as by placement of a leather wrap on the surface. The surface, whether enhanced or not, enables the user to simply reach over and grasp the handle and hold the hand grip while moving the lever 24 in pivotal motion.

The lever 24 is able to rotate about an axis of rotation defined by the shaft 20. The shaft 20 is supported for rotation by the upstanding plates 16 and 18. The plates 16 and 18 frictionally engage the shaft and provide some frictional resistance to easy rotation. Moreover, the lever 24 connects in two directions to enable operation, thereby manipulating both of the foot operated controls namely those concerned with starting and stopping of the vehicle. In particular, the lever 24 connects with a forwardly extending tab 28 which is perforated with a small opening or hole to permit pivotal connection with a connective pin and cooperative clevis 30 which is anchored at one end of a control cable 32. More will be noted regarding the control cable 32 hereinafter. The lever 24 also connects with a rearwardly projecting crank portion 34. The crank 34 has a long slot 36 formed in it which provides for a lost motion connection with another clevis 38. The clevis 38 supports a transverse pin 40 which fits in the slot 36. The dimensions of the fastening pin enable the pin to relatively slide along the slot 36. As illustrated in FIG. 1 of the drawings, the pin is at the back end of the slot in the position illustrated. This limits its range of travel, the range of travel being related to the mode of operation as will be detailed below.

The clevis 38 defines a relatively long link between the clevis at its deepest throat extending to the pin 40. The clevis connects with a control cable 42. A sleeve 44 is anchored by a sleeve coupling 46 to the upstanding tab 14. The sleeve 44 has been broken away to show the enclosed control cable 42 which extends from the sleeve.

The control cable 42 inside the sleeve 44 extends to the forward part of the vehicle. More specifically, the sleeve 44 in conjunction with the cable 42 is routed in a curved pathway 46 shown in FIG. 2 and extends forwardly and beneath the fire wall 48. The fire wall is that partition of the vehicle which defines the driver's compartment and separates it from the engine compartment. The flexible cable and associated sleeve are routed along a suitable route to extend from the installed equipment to a point forward of the fire wall. The fire wall is just below and immediately adjacent to the area where the user is permitted to rest their feet when the pedals are not operated. The numeral 50 identifies the brake pedal. The pedal 50 is hung by a mounting arm 52 which connects with a pivot which is behind the fire wall 48 and which is typically beneath the dash and out of sight. The pedal 50 in conjunction with the hanger arm 52 enables the operator to apply the brakes through the hydraulic brake system of the vehicle which is operated by the pedal. On operation, the pedal is pressed towards the floor board or fire wall 48. As will be understood, the fire wall has a vertical portion and a sloping portion which are located forward of and beneath the dash area where the instrumentation for the vehicle is normally provided.

The flexible cable is routed to a location which is approximately under the brake pedal 50. The flexible cable 42 extends up toward the brake pedal. The flexible cable 42 is preferably routed through a fixed fitting 54 which aligns the cable so that it extends directly towards the brake pedal. It is constructed and arranged so that the flexible cable 42 pulls the brake pedal downwardly. The brake pedal 50 is applied by foot operation in the ordinary fashion and that aspect of its operation need not be altered. The brake pedal 50 thus moves toward the floor board when the pedal 50 is applied in ordinary operation. In operation with this apparatus, when the cable 42 is pulled, the brake pedal is pulled toward the stopping position. In other words, the brake is simply applied. Needless to say, this interaction with the brake system of the vehicle occurs in the ordinary and usual fashion.

Figure 2:
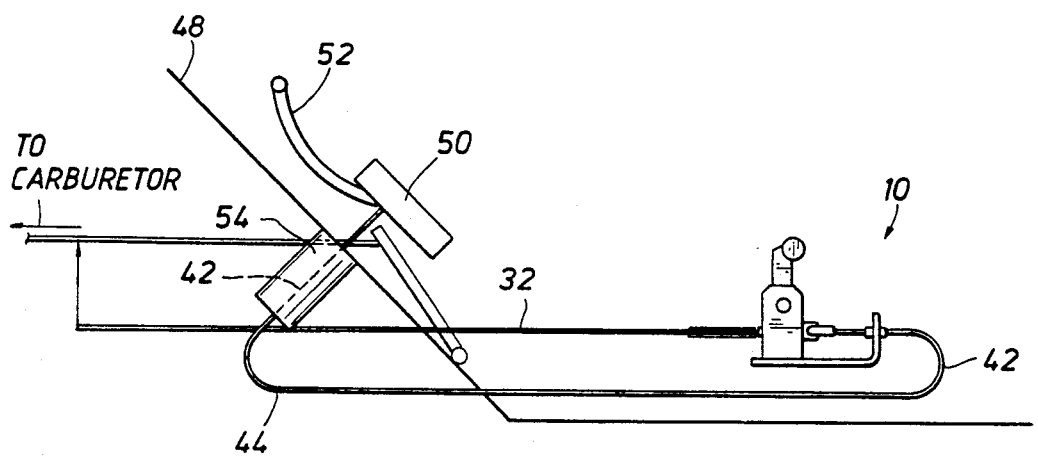
FIG. 2 is a schematic view showing the relationship of the apparatus with respect to the pedals of the vehicle.

The sheath 44, broken away in FIG. 2 of the drawings, is incorporated to guide the flexible cable so that it can provide a stroke to the pedal of sufficient length. This stroke is achieved by pulling the handle 26 to the rear as shown in FIG. 1 of the drawings. The operator is able to reach to the handle 26, grasp it by reaching around the handle with all four fingers, and then pulling towards the rear of the vehicle. That movement is transferred by means of a lever 24 rotating about the pivot or axis defined at the pivot 20 and pulls the bell crank mechanism forwardly. When that occurs, the forward stroke delivered to the crank arm 34 transfers motion. The motion transferred is first accomplished by taking up slack at the slot 36 which cooperates with the pin 40. The pin 40 moves to the rear of the slot. Further movement by the operator is able to pull the flexible cable 42 toward the handle 26 as shown in FIG. 1 of the drawings. The arrow marked in FIG. 1 shows the direction in which the cable 42 must move to apply the brakes. That motion is transferred through the cooperative cable and sheath mechanism so that it is applied to the brake pedal 50, see FIG. 2 of the drawings. That applies the brake mechanism and holds it so long as the operator holds the handle operated mechanism in FIG. 1 in that position.

The vehicle is powered in the forward direction by movement of the handle forwardly of the vehicle. This pulls on the flexible cable 32. The cable 32 is provided with a sheath, a portion thereof being broken away, to thereby enable the flexible cable 32 to be pulled toward the rear of the car. That cable is connected forwardly of the fire wall either to the accelerator linkage so that movement in that direction will advance the engine speed, or it is connected directly to the carburetor for accomplishing the same result. The point of interconnection is preferably somewhere in the linkage system between the carburetor and the accelerator pedal.

For convenience sake, both of the cables which are shown in FIG. 2 of the drawings and which extend from the apparatus 10 typically are hidden from sight in substantial detail. For instance, the flexible cable 32 extends forwardly and can be hidden from view at any convenient location where it is possible to pass under the carpet in the passenger compartment, and to extend below or beneath the vehicle. Routing can be accomplished in any fashion. In like fashion, the brake connected cable 42 and the associated sheath are jointly routed either through the hump or under the floor board. As observed in FIG. 2 of the drawings, the connective cable of the equipment is required to make a 180° turn; that turn is accomplished at the point of entrance through the cowling around the hump. It may be necessary to perforate the carpet in the car to extend the apparatus shown in FIG. 2 through and underneath the sheet metal defining the floor board and hump covering cowling.

As will be further understood the present apparatus is preferably installed and left permanently in a car so long as the driver is disabled. Should the driver recover, the apparatus 10, having once been installed, can thereafter be removed. Alternatively, it can be left in the vehicle indefinitely. In that event, it simply becomes a permanent fixture as part of the particular vehicle to aid and assist in driving, and especially by those who might be handicap. Even with this installation, the vehicle can be driven in the ordinary fashion by application of foot power to the brake pedal 50 and normal operation of the accelerator pedal mounted on the sloping floor board 48.

The range of travel of the handle in the forward and rearward stroke is perhaps between 4 and 8 inches. As the engine speed is increased, the handle 26 is moved forwardly. This holds the engine at a faster speed but it does not interfere with operation of the brake system. In other words, an increase in engine speed is accompanied by movement of the pin 40 in the slot 36, there being lost motion which does not simultaneously apply the brakes. Rather, the engine speed is controlled in the intended fashion while the brakes are not applied. At the time of applying the brakes, the driver is required only to pull backwardly on the handle. This changes the engine speed setting, reducing engine speed to the idle speed. Moreover, the brakes are applied. Quite obviously, the brakes are held for an interval determined by the operator. They can be released quickly or slowly depending on circumstances.

While the foregoing is directed to the preferred embodiment, the scope thereof is determined by the claims which follow:

I claim:

1. An automobile attachment to enable hand operation by a driver of an automobile, the attachment comprising:
   (a) a mounting bracket adapted to be attached to an automobile at a location proximate to a driver of said automobile to enable said driver to reach a handle to engage said handle during ordinary operation of said automobile; and
   (b) control means manipulated by said driver engaging said handle wherein said control means connects to a first cable means extending to an automotive brake system for operation of said brake system;
   (c) said control means also connects to a second cable means, said second cable means connecting an acceleration linkage; and
   (d) said mounting bracket comprises a base plate having upstanding means thereon supporting a generally horizontal shaft serving as a pivot and said shaft supports a moveable lever means connected with said handle and said moveable lever means comprises said control means.

2. The apparatus of claim 1 wherein said control means moves said first cable means in opposite directions to operate the brake system and to release the brake system after operation, and said lever means including lost motion means.

3. The apparatus of claim 2 wherein said lever means connects to a bell crank comprising a part of said lost motion means.

4. The apparatus of claim 3 wherein said lost motion means comprises an elongated slot and pin moveably positioned therein.

5. An automobile attachment to enable hand operation of an automobile, the attachment comprising:
   (a) a mounting bracket adapted to be attached to an automobile at a location proximate to a driver of said automobile to enable said driver to reach and engage a handle during ordinary operation of said automobile; and
   (b) control means manipulated by the driver engaging said handle wherein said control means connects to a first cable means extending to an automotive brake system for application and release of said brake system and a second cable means extending to an automotive accelerator to vary the speed of an engine.

6. An automobile attachment to enable hand operation of an automobile, the attachment comprising:
   (a) control means having first and second cable means for controlling both automotive braking and acceleration wherein one or the other is selected by an operator and is operated to the exclusion of the other; and
   (b) lost motion means connecting to the first and second cable means for hand operation.

7. The apparatus of claim 6 wherein said control means comprises means moving said cable means in two opposite directions to operate a brake system and to release the brake system after operation.

8. The apparatus of claim 7 wherein said lost motion means comprises an elongated slot and pin therein.

9. An automobile attachment to enable hand operation of an automobile, the attachment comprising:
   (a) a mounting bracket adapted to be attached to an automobile at a location proximate to a driver of said automobile to enable said driver to reach and engage a handle during ordinary operation of said automobile; and
   (b) control means, including lost motion means, manipulated by the driver engaging said handle wherein said control means connects to a first cable means extending to an automotive brake system for operation of said brake system and a second cable means extending to an automotive accelerator to vary the speed of an engine.

10. The apparatus of claim 9 wherein said control means includes a bell crank.

11. The apparatus of claim 10 wherein said lost motion means includes an elongated slot and pin therein.

* * * * *